United States Patent
Viner

(10) Patent No.: US 10,878,638 B2
(45) Date of Patent: Dec. 29, 2020

(54) AUGMENTED-REALITY IMAGE PROCESSING

(71) Applicant: Facebook, Inc., Menlo Park, CA (US)

(72) Inventor: David Michael Viner, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/744,036

(22) Filed: Jan. 15, 2020

(65) Prior Publication Data

US 2020/0151961 A1   May 14, 2020

Related U.S. Application Data

(63) Continuation of application No. 16/034,192, filed on Jul. 12, 2018, now Pat. No. 10,580,218.

(51) Int. Cl.
*G06T 19/00* (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS

| | | | |
|---|---|---|---|
| 9,973,792 B1* | 5/2018 | Delachanal | H04N 21/4316 |
| 2007/0070069 A1* | 3/2007 | Samarasekera | G06F 3/011 |
| | | | 345/427 |
| 2013/0314442 A1* | 11/2013 | Langlotz | G06T 19/006 |
| | | | 345/633 |
| 2015/0084951 A1* | 3/2015 | Boivin | G06T 19/006 |
| | | | 345/419 |
| 2017/0104821 A1* | 4/2017 | Scurrell | H04L 67/1095 |
| 2018/0211401 A1* | 7/2018 | Lee | G06T 7/593 |

* cited by examiner

*Primary Examiner* — Yi Wang
(74) *Attorney, Agent, or Firm* — Baker Botts L.L.P.

(57) ABSTRACT

In one embodiment, a computing system accesses a tracking record of a real-world object during a first movement session. The first tracking record comprises a plurality of locations of the real-world object relative to a first user. The system determines a display position of a virtual object representing the real-world object on a display screen of the second user based on the tracking record of the real-world object and the current location of the second user. Based on the determined position of the virtual object on the display screen, the system displays the virtual object on the display screen.

20 Claims, 6 Drawing Sheets

AUGMENTED-REALITY IMAGE PROCESSING

PRIORITY

This application is a continuation under 35 U.S.C. § 120 of U.S. patent application Ser. No. 16/034,192, filed 12 Jul. 2018.

TECHNICAL FIELD

This disclosure generally relates to image processing, and in particular to systems and methods for augmented reality effects.

BACKGROUND

Augmented Reality (AR) effects are computer-generated visual effects (e.g., images and animation) that are superimposed or integrated into a user's view of a real-world scene. Certain AR effects may be configured to be placed with objects in the real world. For example, a computer-generated unicorn may be visually placed on a real-world table. The augmented effect may be presented in a variety of ways. For example, the real-world table may be captured by the camera of a mobile smartphone and displayed in real-time through the device's display. In addition to displaying the table, the computing device may also display the unicorn, integrating it with the video of the table that is being displayed. As another example, a user may be viewing the real-world through AR glasses or viewing optics. Like regular glasses, the AR glasses may have one or more lenses that are translucent so that the user may see real-world objects through the lenses. A computer-generated unicorn may be projected onto the lenses so that the unicorn is seen along with any real-world object that is visible through the lenses.

A mobile computing device, such as a smartphone, AR glasses or headset, tablet computer, or laptop computer, may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Movement progress or performance is often measured based on distance as a function of time. For example, a jogger may measure his jogging performance based on how far he has traveled over a period of time. To compare his current performance with his past performance or with someone else's performance, the jogger typically can only compare metrics that measure the end results: he could compare the amount of time taken to complete a particular jogging distance or route, or he could compare the distance jogged within a particular duration. In either case, the jogger lacks feedback on his progress or performance while he is jogging and only has a sense of how he did after-the-fact.

Embodiments described herein relate to an AR feature where a virtual travel or pacing companion is presented to a user while he is engaged in an activity (e.g., jogging, walking, biking, driving, etc.) in order to provide the user with visual progress comparison in real-time. In particular embodiments, the user's locations may be tracked and used for positioning a virtual reference object (e.g., an avatar) for display on a user's AR device while the user is engaged in the activity. That virtual reference object, such as a virtual avatar or character, may be presented to the user as an AR effect that is integrated with real-world scenes. Based on the relative position of that virtual reference object (e.g., the virtual reference object may appear ahead of or behind the user), the user may gauge how well he is currently performing.

One challenge with the above feature relates to how to present the virtual reference object (or "virtual object" for short) so that the visual cues associated with the virtual reference object can accurately reflect and convey the relative position and/or orientation between the user and the reference object. In particular embodiments, a computing system may track the current user's location with respect to a start time and display a virtual reference object in the user's field of view based on the relative position between the user and the reference object at corresponding moments in time. For example, if the user has jogged for 3 minutes in the current jogging session, the computing system may ascertain from previous tracking data of the user (or another user) where he was located after jogging for 3 minutes. The relative position between where the user currently is and where he was previously may be used to determine a depth and/or orientation measurement for the virtual reference object with respect to the user. The appearance of the virtual object can be adjusted based on the determined depth (e.g., the object may appear larger if it is closer to the user and smaller if it is farther). Where the virtual object is positioned within the field of view of the user can be determined in accordance with at least the depth and/or orientation of the virtual object, as well as the slope or contour of the surrounding real-world scene (e.g., the streets may slope upwards or downwards). For example, the virtual object can be displayed higher on the user's AR display screen, such as a pair of AR glasses or a smartphone's screen, if the user is looking and jogging up a hill and the virtual object is ahead of the user.

In general, embodiments described herein relate to an AR feature that provides real-time visual comparison of a user's current activity against past recorded activities of the user himself or past or current activities of others. An AR application may track and record a first movement session of a user (or another person, such as a friend of the user). The tracking record may comprise a plurality of locations with respect to a first start time of the first movement session, and each location is associated with a time at which the location may be recorded. Then, the AR application can be invoked again to track the user's current location in a second movement session with respect to a second start time. Based on the user's current location, the AR application may determine how the virtual companion should appear in the field of view of the user. The AR application, using the tracking record, may first determine a past location (e.g., GPS coordinates) or travel distance (e.g., half a mile) of the user at a corresponding moment in the first movement session based on the current time in the second session. For example, if the user has jogged for 3 minutes in the current jogging session since the start of the session, the computing system may retrieve the user's past location or traveled distance when he was 3 minutes into his previous jog. The past location or travel distance of the user in the prior session may be used to determine a relative position between the user's current location and the virtual companion, which in turn may be used to determine where the virtual companion should be in the real-world scene. The depth (i.e., distance from the current user) and orientation of the virtual companion can be determined based on the relative position, and the position of the virtual companion on the user's AR display can be determined by the AR application. The appearance of the virtual companion may be adjusted accordingly to be realistically displayed on the user's AR display (e.g. AR glasses or smartphone screen) based on the determined virtual companion's position.

In particular embodiments, the application may first track and record a user's first movement session using a particular tracking method, such as GPS. The AR application may be triggered by a start time, such as when the user presses a "start" button, and start tracking the user's locations (e.g., GPS coordinates including longitude and latitude) along a route. Each snapshot of the user's location information may include a GPS coordinate, time, altitude, pace, or any other relevant information related to the instant at which the user's location was recorded. For example, for each location tracked, a corresponding time may be associated with the location at which the location is recorded. Based on the tracking record, the AR application can figure out a corresponding past location in the tracking record with respect to the user's current movement, such that if the user has been running for 10 seconds from a start time in the current session, the corresponding past location may be determined when the user had been running for 10 second during the recorded first movement session.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing system may be configured to create a virtual "companion" (e.g., for performance comparison or pacing purposes) and integrate the virtual companion as an AR effect into a user's view of a real-world scenes. Based on the relative position of that virtual companion and the user's current location, the user be presented with a visual comparison of his current movement (e.g., jogging, walking, biking, or skiing progress) against his own past movement or another user's past or concurrent movement at a corresponding moment in time with respect to a start time. For example, with a pair of AR glasses or a smartphone screen, the user may be able to see the virtual companion running ahead or behind him in the field of view of the user.

In particular embodiments, the computing system may activate an AR application to track a plurality of user's locations (e.g., GPS locations) and record the user's location data in a tracking record. The record may represent a prior running record of the user from a start time, and it may be used in a subsequent activity session (e.g., running) to generate a virtual companion. The virtual companion may be displayed on the user's AR glasses for visually demonstrating where the user was in the prior activity. The display of the virtual companion may be determined based on the user's past location in the tracking record, the user's current location tracked by the computing system, the orientation between those positions, and/or the characteristics of the current real-world environment (e.g., depth information, slope information, road locations, etc.). As an example, the virtual companion can act as a running (or other types of activity, such as driving or sailing) teammate for training or comparison purpose. The virtual companion can represent the user himself or others in a prior activity session, such that the virtual companion can be used to visually show the user how the user is currently doing compared to how he or others did in the prior session. For example, when the user is jogging slower in the current session than he was in a recorded prior session, the virtual companion may be seen jogging ahead of the user on the user's AR glasses. As another example, when the user is faster in the current session than he was in the recorded prior session, the virtual companion may be seen jogging behind the user when the user turns around.

Figure 1:
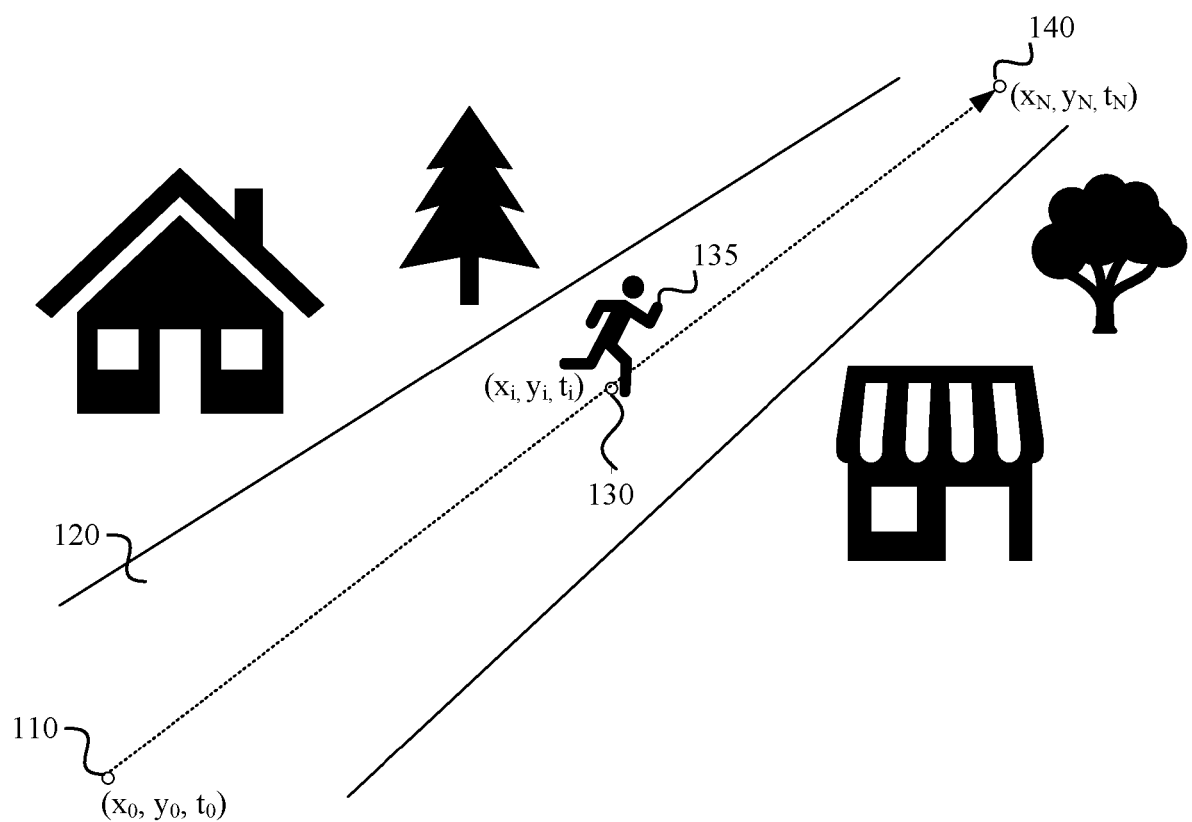
FIG. 1 illustrates a snapshot of an example scenario 100 during a first movement session, in accordance with particular embodiments.

FIG. 1 illustrates a snapshot of an example scenario 100 during a first movement session, in accordance with particular embodiments. The scenario 100 shows a user 135 jogging along a route 120. Using an AR application, the user 135 may begin recording (e.g., stored locally on the device running the AR application or a mobile device or stored remotely on a server) a movement session at starting location 110. For example, at the beginning of the user's run, he may have launched the AR application on his mobile device and indicated that a movement session is to be recorded (e.g., by pressing a button, giving a voice command, or making a gesture to indicate a desire to start the recording). The starting location 100 is represented by ($x_0$, $y_0$), which may represent the GPS location measured by the user's mobile device (e.g., longitude and latitude coordinates), and the start time of the movement session is represented by $t_0$. Once the movement session begins, the AR application may track and record the user's movements and the times at which the locations are recorded. In the illustrated snapshot scenario 100, the user 135 may have jogged to location 130, represented by ($x_i$, $y_i$), at time $t_i$. The user 135 may continue to jog until the movement session ends, at which time the recording may cease. The ending location 140, denoted by ($x_N$, $y_N$) and associated with time $t_N$, represents the location at which the movement session ends. The movement session may be terminated by the user 135 (e.g., by pressing a button, giving a voice command, or making a gesture to indicate a desire to end the session) or it may terminate automatically (e.g., upon satisfying one or more predetermined criteria, such as after reaching a predetermined jogging duration, distance, or destination). At the end of the movement session, N number of locations and their associated times may be recorded and associated with that movement session. The recordings may include data of the user's movement during the movement session (e.g., as the user 135 jogs along the route 120), such as a plurality of locations from the starting location 110 to the ending location 140 and the time at which each of the plurality of locations is recorded.

The user's movement data may be represented and recorded in a variety of ways. In particular embodiments, as described above, movement recordings may be represented by GPS coordinates. In other embodiments, each movement recording may be represented by the distance traveled since the movement session began. For example, the AR application may use the GPS readings from $t_0$ to $t_i$ to estimate the distance traveled by the user 135 in that time period and associate that distance with the recording time $t_i$. In particular embodiments, the AR application may also record the user's altitude at the recording time $t_i$. In particular embodiments, the AR application may further record the user's velocity and acceleration (e.g., based on GPS and/or accelerometer measurements) at the recording time $t_i$.

The recorded time data associated may also be represented in a variety of ways. For example, the recorded time associated each recording may be an absolute timestamp in Unix time (e.g., the user 135 was at location 130 ($x_i$, $y_i$) at timestamp $t_i$=2018-06-10T11:03:00.00 or an equivalent sequential-number representation). In this case, the user's running duration d can be computed as $d=t_i-t_0$. As another example, the recorded time may be a timestamp or duration relative to the start of the movement session. For instance, a relative timestamp, which may also represent a duration since the start of the movement session, may begin counting when the movement session begins, similar to a stopwatch.

The data recorded in the first movement session (e.g., as described with reference to FIG. 1) may be used to generate a virtual companion in a second movement session. In particular embodiments, the second movement session may be invoked by the same user whose movement data were recorded in the first movement session. For example, after the user has recorded his jogging data in the first movement session, he may jog again at a subsequent time and use the virtual companion to see, while jogging, how he is currently doing compared to how he did in the first movement session. In particular embodiments, the user in the second movement session may be different from the user in the first movement session. For example, after user A recorded his movement data in the first movement session, the recorded data may be used by user B in a second movement session so that user B can see how he does compared to user A. In particular embodiments, the movement data recorded in two movement session may be shared in real-time to enable two users to compare their performances as they are both engaged in the activity (e.g., two joggers may race against each other in substantially real-time). For example, the AR applications executing on the users' respective devices may communicate through a server (e.g., a social networking server). The AR applications may begin respective movement sessions at the same time and share the recorded movement data. For example, at time user A's movement data (e.g., distance traveled since the start time) may be sent to user B's device and user B's movement data (e.g., distance traveled since the start time) may be sent to user A's device. Using the movement data, each user's AR application may render a virtual companion that represents the other user, giving the users a virtual racing experience.

Figure 2:
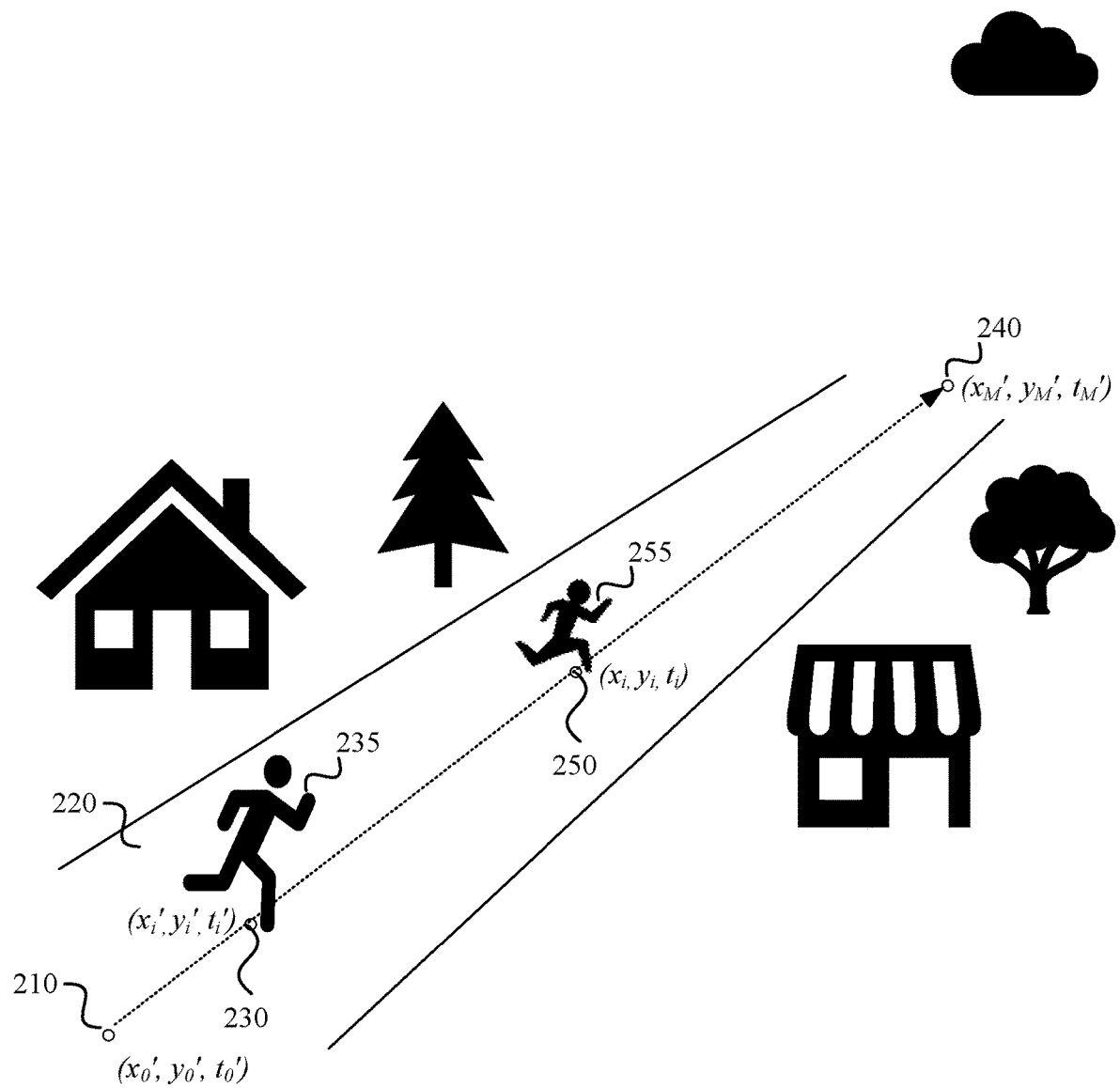
FIG. 2 illustrates a snapshot of an example scenario 200 during a second movement session, in accordance with particular embodiments.

FIG. 2 illustrates a snapshot of an example scenario 200 during a second movement session. The scenario 200 illustrates where a virtual companion 255, generated based on the movement data recorded in the first movement session (e.g., as described with reference to FIG. 1), would conceptually be located relative to a user 235 (who could be the same user 135 who recorded the first movement session or a different user). The example shows the user 235 jogging along a route 220, which could be the same route 120 shown in FIG. 1 or a different one. If the routes are the same, particular embodiments may determine the virtual companion's 255 relative position to the user 235 based on GPS coordinates or distance measurements. If the routes are different, particular embodiments may determine the virtual companion's 255 relative position based on distance measurements. The distance measurements may be what was recorded during the first movement session or derived from recordings of GPS coordinates. To derive distance measurements from recorded GPS coordinates, the AR application may translate the coordinates into distance measurements by computing the distance traveled between successive GPS locations.

In the example shown, the user's 235 starting location 210 with respect to time in the second movement session can be represented by ($x_0'$, $y_0'$, $t_0'$), wherein $t_0'$ is the time at which the starting location 110 ($x_0'$, $y_0'$) is recorded. The current location 230 of the user 235 in the second movement session with respect to time can be represented by ($x_i'$, $y_i'$, $t_i'$), where $t_i'$ is the time at which the current location 230 ($x_i'$, $y_i'$) is recorded. In the scenario 200 shown, the second movement session will end at location 240 ($x_M'$, $y_M'$) and the corresponding ending time is represented by $t_M'$. At the current location 230, the user's 235 jogging duration can be computed as $d'=t_i'-t_0'$, where $t_i'$ and $t_0'$ are both timestamps.

While the user 235 is jogging in the second movement session, the AR application may generate a virtual companion 255 in the field of view of the user 235 to visually show how his 235 current performance compares with the performance recorded in the first movement session. For example, in the second movement session, the user 235 may start tracking his current movement by invoking the AR application at time $t_0'$. At the user's 235 current location 230, the AR application may compute where the virtual companion 255 should appear relative to the user 235 at that instant. For example, the AR application can determine that the user's 235 current running duration in the second movement session is $d'=t_i-t_0'$ (in certain embodiments, timing information may alternatively be tracked as session duration). Based on this duration d', the AR application may query the recorded first movement session to determine where the user 135 was in the first movement session after jogging for d' time. For example, from the recorded first movement session, the AR application may determine that d'=d, where $d=t_i-t_0$ is the corresponding relative time with respect to the start time $t_0$ in the first movement session. The location $(x_i, y_i)$ 130 recorded at time $t_i$ in the first movement session can be retrieved from the tracking record and used to position the virtual companion 255. For example, the companion 255 representing the user 135 at the location 130 in the first movement session can be conceptually placed relative to the user 235 in the second movement session based on a relative distance between the retrieved past location 130 and the current location 230 of the user 235.

To illustrate, the user 235 in the second movement session may have started at the same location as the user 135 in the second movement session and jog along the same route (i.e., $x_0=x_0'$, $y_0=y_0'$, and route 120 is the same as route 220). At the current time $t_i'$ in the second movement session, the AR application may figure out that the user 235 has been running for 50 seconds (s) from the starting location $(x_i', y_i)$ 210, so that $d'=t_i-t_0'=50$ s. By checking the tracking record of the first movement session, the AR application can retrieve the past location $(x_i, y_i)$ 130 of the user 135 in the first movement session when the user 135 had been running for 50 s from the starting point 110 in the first movement session. Thus, 50 s into the jog, the user 235 is at location 230 in the second movement session while the user 135 was at location 130 in the first movement session. The relative distance between location 130 and location 230 can be computed to determine the position 250 of the virtual companion 255. For example, the relative distance between location 130 and location 230 may be 4 feet. By knowing the relative distance, the AR application may be able to determine the depth and position 250 of the virtual companion 255 in the field of the user's view in the second movement session.

The location 250 of the virtual companion 255 relative to the user 235 may be used to simulate depth-perception cues for the virtual companion 255. The AR application may geometrically adjust the appearance of the virtual companion 255 as it appears on the user's two-dimensional display. For example, when the location 250 of the virtual companion 255 is far ahead of the current location 230 of the user 235, the depth of the virtual companion 255 in the field of view of the user 235 is deeper. The size of the virtual companion 255 may be scaled with respect to the depth, such that the virtual companion 255 may appear smaller in the field of view of the user 235. For example, if the virtual companion 255 is to be 100 feet away from the user 235, the AR application may geometrically scale the size of the virtual companion 255 to appear smaller (e.g., a 5-foot-tall virtual companion 255 may be scaled to be 1 inch-tall) in the field of view of the user 235. As another example, when the relative distance between the location 250 of the virtual companion 255 and the location 230 of the user 235 is approximately the same, the depth of the virtual companion 255 may equal to zero or almost zero. As such, the size of the virtual companion 255 may not need to be scaled smaller when it is displayed on the user's AR device. The virtual companion's dimension may be scaled geometrically based on the depth thereof or based on other mathematically models (e.g., 3D model), to create a realistic visual effect of the virtual companion 255.

In addition to scale, proper placement of the virtual companion 255 on the two-dimensional display of the AR device also influences depth perception. Particular embodiments may estimate the depth of real-world objects and integrate the virtual companion 255 into the scene so that it is placed with real-world objects that are similarly far from the user 235. By processing images of the user's surrounding, the AR application may identify objects in the user's view, detect the position, topology, and depth (e.g., distance) of the objects, and place or track the virtual companion in the scene accordingly. In particular embodiments, the AR application may determine the 3-dimensional layout of the surrounding using various techniques, such as monovision or stereo vision image processing techniques using cameras of the AR device. For example, the inside-out facing cameras (analogous to human eyes) of the AR glasses may capture images of the surrounding environment and those images may be used to compute depth information of objects in the environment using triangulation techniques. Any other object detection technologies and/or depth perception technologies may additionally or alternatively be used. The depth information of objects in the real-world may be used to more accurately position the virtual companion 255. For example, if the relative distance between the virtual companion 255 and the user 235 is 10 feet, the AR application may position the virtual companion 255 based on other objects that are known to be approximately 10 feet from the user 235 (e.g., a ground segment or a tree may be 10 feet away). The AR application may also interpolate known distance information to approximate the desired ground position. For example, if a tree that is 11 feet away and a street sign that is 9 feet away, the ground between would be approximately 10 feet away.

In particular embodiments, the position of the virtual companion 255 in the field of view of the user 235 may be determined based on the orientation of the user's AR device. For example, when the virtual companion 255 is ahead of the user 235 the virtual companion can be displayed on the user's AR display when the user looks straight forwards. When the user turns to his left, the position of the virtual companion in the field of the user's view may accordingly move towards the right of the AR display, and eventually phase out from the user's view. When the virtual companion is behind the user, the virtual companion may not be shown on the user's AR display when the user looks forwards. However, the virtual companion may be displayed on the user's AR display when the user looks backwards. Similarly, when the user looks up or down, the position of the virtual companion in the field of the user's view may be adjusted accordingly.

In particular embodiments, the first movement session may be a pre-recorded or real-time session of tracking an object, such as a golf ball. The AR application may track and record the locations of the golf ball as it flies through the air after being hit. The distance between the user and the golf ball may be determined using any suitable depth-sensing technology (e.g., using two cameras placed a known distance apart to capture images of the golf ball and using triangulation to compute depth). During a second movement session, the positions of a virtual golf ball may be determined using the recordings from the first movement session. The virtual golf ball may be displayed on the user's AR display based on the determined positions so that the user can see how his current shot compares with the shot in the first movement session. For example, the user may compare his current golf shots with his own shots a prior recorded game or remotely play a golf game with his friends via a network.

In particular embodiments, the AR application can record or track people or objects moving through space over time, such as a user sailing, skiing, biking, golfing, or any activities during a movement session (e.g., a session having a start time, end time, and a plurality of tracked locations). Based on the recorded data, the AR application may generate a virtual representation of the tracked person or object (e.g., a virtual companion or virtual golf ball) for display on the user's AR display (e.g., AR glasses or smartphone's screen).

In particular embodiments, an AR application may be configured to operate on any computing device, including mobile devices (e.g., smartphones, tablets, laptops, AR glasses, etc.) and other types of computing devices (e.g., desktop computer). Computing devices may have different hardware resources and capabilities, including, for example, CPU and/or GPU, memory, cache, storage, optical sensors, display, and any other system resources that may affect the quality of the AR effect produced by the AR application. In particular embodiments, an AR application may be configured to obtain video frames of a real-world scene captured by a camera communicatively coupled to the device on which the AR application is running. By processing the video frames, the AR application may track real-world objects captured within the video frames. In particular embodiments, the AR application may support multiple types of tracking algorithms.

In particular embodiments, the appropriate AR effect may be created with realistic visual cues in the field of view of the user as it is integrated with the real-world scene. For example, the virtual companion may appear larger when it is closer to the user and smaller when it is farther away. For example, the AR application may determine that the distance between the user's current location and the location where the virtual companion should be 10 feet. By knowing the relative distance between the user's current location and the location of the virtual companion, the AR application may determine that the virtual companion should appear about 1-inch in height to provide the user with the appropriate depth-perception visual cue. The depth perception refers to the change of the objects' appearance in the field of the user's view with respect to the relative distance of the objects to the user (e.g., the width of a road may appear narrower the farther away it is from the user). By knowing the depth of the virtual companion, the appearance of the virtual companion can be scaled accordingly.

As another example of providing the appropriate visual cues, the virtual companion's position within the field of view of the user may be placed according to where the road appears. For instance, if the virtual companion's position in the field of view of the user is approximately centered when the user is running on leveled ground, the virtual companion may appear higher when the user runs on an upward-sloping road (or appear lower when running downhill), even though the relative distance between the user's current location in the second movement session and the past location of the user in the first movement session may be the same in both scenarios.

In particular embodiments, object-recognition and depth-sensing technology may be used to identify objects in the real-world scene (e.g., roads, buildings, etc.) so that the virtual companion may be integrated with the scene more realistically. For example, if the virtual companion is to represent a jogger, the system may try to place the virtual companion on a real-world road segment that is within the user's field of view. Based on the relative distance between the virtual companion and the user, the system may identify, using object-recognition (e.g., a machine-learning modeled trained to recognize road) and/or depth-sensing technology (e.g., Simultaneous Localization and Mapping or SLAM algorithm), a road segment that is at the desired distance from the user. Based on this determination, the system may have the virtual companion appear on top of that road segment. In particular embodiments, object-recognition and depth-sensing technology may be used to generate a contour map of the terrain within the user's field of view. For example, object-recognition technology may be used to identify roads, and depth-sensing technology may be used to determine how far points along the road or road segments are from the user. Such information may be used to generate a contour map. A contour mapping of the real scene in the user's view can enable the AR application to correctly place the virtual object in the user's view based on a determination of the appropriate ground segment for the virtual companion to "touch" on. For example, based on the contour map, the computing system may be able to identify a road segment in the user's 2D field of view that is of the desired distance away from the user for placing the virtual companion. By knowing the size of the virtual companion and the position of the virtual companion in the field of the user's view in the contour map, the tracking system may place the virtual companion in the field of the user's view so that the virtual companion may be displayed realistically on the user's AR display.

In particular embodiments, the AR application may determine the relative orientation between the user's field of view and the position of the virtual companion to determine whether the virtual companion is visible to the user. For example, the field of view of the user may be based on the orientation of the user's AR device, which can be detected using motion sensors, such as a gyroscope or an inertial measurement unit. Based on the relative position between the user and the virtual companion, the system may determine whether the virtual companion is within the user's field of view and selectively display the virtual companion. For example, when the virtual companion is behind the user (e.g., this may happen because, in the same amount of time, the user has traveled farther in the current jogging session than he did in a previous jogging session), the virtual companion may not be shown in the field of the user's view when the user looks forwards (e.g., the camera of the AR device is facing forward), but it may be shown in the field of the user's view when the user looks backwards. Similarly, if the virtual companion is positioned next to the user, the user would be able to see the virtual companion when he turns sideways.

In particular embodiments, the relative placement of the virtual companion may be based on the recorded altitude or elevation. For instance, beyond the GPS coordinates, the altitude of the user's location may be detected by a barometer or altimeter and recorded while the user is traveling during a session. During a subsequent session, the AR application may determine how the virtual companion should appear based on the recorded altitude information in addition to other recorded location information as described above. For example, the AR application may determine that, based on a comparison of the user's current altitude and the recorded altitude, the virtual companion should be placed higher or lower based on the computed difference between the altitudes. If the AR application detects elevation changes in the surrounding grounds (e.g., based on the aforementioned contour map or depth-sensing algorithms), the application may choose to place the virtual companion on a relatively lower or higher surface based on the relative difference in altitude. In doing so, the AR application may further improve the accuracy and realism of the virtual companion in the user's view.

In particular embodiments, the AR application may determine the position of the virtual companion with respect to the user's current location using GPS data. For example, during a movement session, the AR application on the user's device may determine that the location of the virtual companion should be ahead of the current location of the user based on a comparison of the previously-recorded GPS location for the virtual companion and the current user's GPS location. Since the GPS location of the virtual companion is ahead of the user, the virtual companion may be displayed somewhere ahead of the user in the field of the user's view when the user is facing forward. In particular embodiments, since the GPS may only sample locations periodically for creating the tracking record, the AR application may interpolate the recorded locations to retrieve a past location of the user with respect to a specific time that falls between the recording times of two GPS samples.

The mere existence of the virtual companion, without more, would convey to the user that the virtual companion is ahead but it may not provide sufficient visual depth-perception cues to indicate how far ahead the virtual companion is. Thus, in particular embodiments, the AR application may further determine how the virtual companion should appear in the field of the user's view to provide the appropriate visual cues. In particular embodiments, the AR application may use computer vision technologies (e.g., SLAM or other depth-sensing technologies and object-recognition technologies) to determine where the ground is relative to the user and position the virtual companion on the AR display so that the virtual companion appears to be on the ground and at the appropriate distance from the user. Thus, for example, if the ground slopes upwards, the virtual companion may be placed higher within the field of view of the user to make it appear that the companion is jogging upwards on the slope. In particular embodiments, the scale of the virtual companion may also depend on the relative distance between the virtual companion and the user, so that the virtual companion appears smaller when it is farther and larger when it is closer to the user.

In particular embodiments, the AR application may use a 3D model to determine how the virtual companion should appear. The 3D model may represent the environment surrounding the user, along with a representation of the user's viewpoint. Based on the relative position between the user and the virtual companion, the AR application may place the virtual companion at a specific region in the 3D model relative to the representation of the user's viewpoint. In particular embodiments, altitude information may also be used to refine the virtual companion's location within the 3D model. In embodiments where the AR application uses depth-sensing technology and/or object-detection technology to identify surrounding terrain information (e.g., the contour and depth of roads relative to the user), a 3D model of the terrain may be included in the 3D model, in which case the virtual companion may be positioned within the 3D model on top of the terrain model. When rendering the virtual companion for display, the AR application may do so by determining how the virtual companion would appear to the user's viewpoint representation in the 3D model. For example, the orientation of the viewpoint representation may track the orientation of the user's AR device based on, for example, gyroscope and accelerometer data. Based on the orientation of the viewpoint representation, the AR application may project rays from the viewpoint into the 3D model environment to see what the rays intersect. If the virtual companion is positioned within the field of view of the viewpoint, then certain rays would hit the virtual companion and a corresponding 2D image of the virtual companion could be rendered and displayed on the user's device. On the other hand, if the virtual companion is not within the field of view (e.g., the user is facing forward but the virtual companion is behind the user), the rays would not intersect the virtual companion and, consequently, the virtual companion would not be visible. Generating the virtual companion using the 3D model may provide a more realistic view of the virtual companion, especially with respect to depth-perception cues, but the trade-off is computation costs.

As discussed previously, particular embodiments may improve the integration of the virtual companion with the real-world scene by using one or more computer vision technologies. For example, objects of interest in the real-world scene (such as roads and tracks) may be tracked using one or more tracking algorithms. Such algorithms may include, but not limited to, Simultaneous Localization and Mapping (SLAM) algorithm (e.g., for generating a 3D model of the surrounding unknown environment and keeping track of the user's location within it), environment-tracking algorithm, face-tracking algorithm, or hand-tracking algorithm. In particular embodiments, the AR application may be configured to select tracking algorithms based on objects' characteristics and computational costs. For example, an AR application may use AR tracking algorithms with high computational costs (e.g., SLAM), AR tracking algorithms with medium computational costs (e.g., region-tracking algorithms), and AR tracking algorithms with low computational costs (e.g., based on gyroscope data without image processing). In particular embodiments, the AR application may switch among the algorithms based on their respective characteristics and device configurations. For example, the AR application may select the most accurate tracking algorithm (e.g., SLAM) as long as the system can handle the cost of expensive computation. When the system determines that the computational cost is too high, the AR application may switch to a relatively less accurate tracking algorithm (e.g., region-tracking algorithm) that is relatively less computationally expensive. In particular embodiments, the AR application may dynamically switch from one tracking algorithm to another during an AR session without the user ever being aware that the switching occurred. By selecting an appropriate tracking algorithm, the AR application is able to provide the optimum results with respect to the system configurations. In particular embodiments, when the AR application transitions from one tracking algorithm (e.g., SLAM) to another (e.g., region-tracking algorithm), the depth information is modeled and understood by SLAM but not be understood by the region-tracking algorithm. Thus, when transitioning from one tracking algorithm to another tracking algorithm, the AR application may transform the tracking data (e.g., depth information) into tracking data compatible with or understood by another algorithm.

In particular embodiments, the AR application may be built on AR software development platforms, such as ARKIT or ARCORE, to enable scene tracking and display virtual objects in the user's view. The AR software development platform can enable the AR application to track the user's real-world surroundings and sense the user AR device or mobile device's orientation and position relative to the environment in the user's view by taking advantage of user mobile device's built-in hardware of cameras and sensors, including motion sensors and camera sensors. The AR application can place 2D or 3D virtual objects in the user's real-world scene, wherein the orientation, dimensions, or position of the virtual objects can be adjusted based on the user's real-world scene.

In particular embodiments, the AR application may determine the position of the virtual companion with respect to the user's current location using a persistent AR world map. The persistent AR world map is a 3D map of the real world integrating at least 3D representation of the real-world images with the map overlays and location-based positioning. The persistent AR world map can be built by the real-world images combined with computer vision, street view, and a world map. When the user travels through the space, the camera of the user's device may capture the real-world images of the user's surrounding. The user's pose (e.g., position and orientation) may be identified with respect to the captured images, and the identified user's pose may be recorded in the persistent AR world map. The persistent AR world map with the recorded user's pose can be stored and shared online with the user's permission (e.g., privacy setting). When other users access the stored persistent AR world map, the recorded user's past pose based on the duration or timestamp with respect to the start of the movement session can be retrieved, and the virtual image can be seen at the past position in the field of other users' views. Additionally, the user's pose may be identified in the persistent AR world map by other methods including text or voice input, etc.

For example, during the first movement session, the user may move through a specific region, while the camera of the user's device captures images/videos of the user' real-world environment. The captured visual information and/or the motion sensor information can be used to generate 3D data, including a 3D mapping of the environment (e.g., using 3D stereo technology, etc.) and the user's position and orientation relative to the real-world environment around him. The images captured during the first movement session can be upload to and processed on a server, or the AR application may locally process the captured images and only upload the resulting 3D data to the server. The server may subsequently "anchor" the user's pose in the persistent AR world map and associate it with the duration or timestamp with respect to the start of the session. For example, the server may first localize the user within the AR world map using the user's GPS location, and then the server may use the 3D data to create or supplement any existing 3D model of the real-world environment at that location within the AR world map and store the user's pose with respect to the 3D model. The persistent AR world map with the anchored user locations can be stored on the server of the system, or a portion (e.g., an area surrounding the user's current location) thereof may be downloaded and locally stored on the user's device. During the second movement session, the AR application can use the user's GPS location to query the AR world map for the associated 3D model and match the currently observed 3D data (e.g., generated based current images of the user's environment) with the 3D model to orient the user within the 3D model. The 3D model may include the user's past locations (e.g., the anchored poses with respect to the environment). Based on the duration or timestamp with respect to the start of the second movement session and the duration information associated with each of the user's past locations, the AR application may determine which one of the user's past locations should be visible (e.g., if the user is 3 minutes into the second session, the user's past location when he was 3 minutes into the first movement session should be visible). If the past location is visible within the user's field of view, a virtual companion at the user's past location with the respective pose may be displayed in the field of the user's view during the second movement session.

In particular embodiments, the captured images can be processed to recognize landmarks (e.g., structures, buildings, curbs, street signs, and other fixed or permanent objects) in the real-world, and the landmarks can be integrated in the persistent AR world map. The landmarks can be used to identify the user's relative position with respect to the environment more precisely. For example, instead of identifying the user's relative position is 100 feet with respect to the entrance of a park, the user's relative position can be identified as 3 feet with respect to a nearby statue in the park. Thus, the user's location can be tracked more precisely. In addition to the GPS information, using visual information (e.g., images), the persistent AR world map may be used to track and record relative locations with respect to the user's environment more precisely. For another example, GPS may indicate that the user is at an intersection. By combining with the visual information captured by the user's camera, the user may be oriented within the persistent AR world map (e.g., the user may be at the intersection (location) facing a clock tower at the corner (orientation) and is 5 feet away from the clock tower (relative position)). As shown in the examples, it may be more precise to track a user's location by using visual information positioning. Therefore, the system can track and record the user's locations in the first movement session more precisely, and user's past location can be retrieved more accurately from the persistent AR world map.

In particular embodiments, when the GPS is not available, using visual information can track the user's relative location with respect to the environment and build a 3D AR map of the specific environment. By integrating a plurality of the 3D AR maps of respective environments, it is possible to build a larger scale comprehensive AR world map. The system can use the AR world map to accurately track user's locations, and the virtual companion can be created accordingly and be displayed in the field of the user's view.

Figure 3:
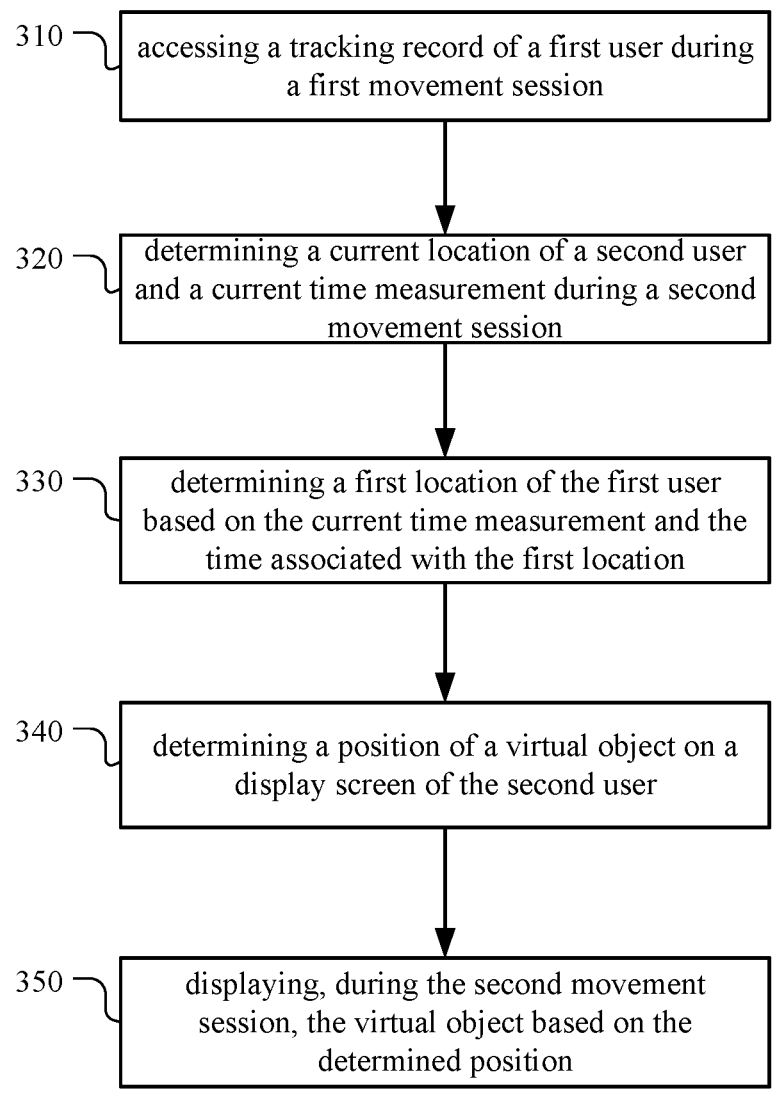
FIG. 3 illustrates an example method of creating a virtual reference object by a computing system in particular embodiments.

FIG. 3 illustrates an example method for creating a virtual object (e.g., representing a user or an object, such as a golf ball or vehicle) by an AR application in particular embodiments. The method 300 may begin at step 310, where a computing system (e.g., mobile phone or AR glasses) running an AR application may access (e.g., local or remote access, such as via a social networking system) a tracking record of a first user during a first movement session. The tracking record may comprise a plurality of locations of the first user and associated time measurements during the first movement session. For example, the tracking record may comprise a plurality of locations, corresponding to tracked movements of the first user during the first movement session, and each of the plurality of locations may be associated with a time at which the location is recorded. The plurality of the locations may be tracked by GPS and/or elevation sensors, traced as a route of the first user, and saved in the tracking record. The recorded locations may, additionally or alternatively, be represented by the distance traveled since the start of the movement session, and the associated time may be represented by the duration since the start of the movement session. The tracking records can be pre-recorded location data saved on a device or a server of a system, or it can be real-time location data accessible via internet or shared on the social networking system. The tracking records can be a past activity session of the first user himself or other users, or it can be real-time location data of other users. The first tracking record may have a starting location and an ending location corresponds to a start time and ending time, respectively.

At step 320, the AR application may determine a current location of a second user and an associated current time measurement during a second movement session. The current location may be represented by a GPS coordinate or the distance traveled since the start of the second movement session. The current time measurement may be the time at which the current location is recorded or the duration to such time since the start of the second movement session. In particular embodiments, the second user's starting location in the second movement session may be the same as or different from the first user's starting location in the first movement session, and the start time of the first movement session and the second movement session may be the same or different as well.

At step 330, the computing system may determine, from the plurality of locations in the first tracking record, a first location of the first user in the first movement session based on the time measurement associated with the first location relative to a start time of the first movement session and the current time measurement relative to a start time of the second movement session. As an example, in FIGS. 1 and 2, the first location 130 of the first user can be retrieved from the first tracking record based on the current time measurement of the second user 235. For example, if the current time measurement in the second movement session is $t_i'$, the amount of time that has elapsed since the start of the second movement session may be represented by $d'=t_i'-t_0'$. The time $t_i$ at which the location 130 is recorded with respect to the starting time $t_0$ of the first user may be represented by $d=t_i-t_0$. If $d'=d$, the AR application may select the location 130 corresponding to the time $t_i$. In particular embodiments, the location may also include elevation information.

At step 340, a position of a virtual object on a display screen of the second user can be determined based on the first location of the first user relative to the current location of the second user. The virtual object may represent the location of the first user in the first movement session. As shown in FIG. 2, at the current time $t_i'$ in the second movement session, the virtual object 255 may be positioned to represent the past location 130 of the first user at the same time relative to the starting time of the first movement session. The appearance of the virtual object 255 in the field of view of the second user 235 can be determined based on the relative distance and/or altitude information between the virtual object's location 250 and the current location 230 of the user 235, for example. The AR application can determine the depth of the virtual object 255 based on the relative distance, and the size of the virtual object 255 can be scaled up or down accordingly.

At step 350, during the second movement session, the virtual object may be displayed based on the determined position of the virtual object on the display screen. For example, in accordance with the AR application, the user's AR device may display the augmented-reality (AR) effect of the virtual object on the display screen based on the tracking data. Since the AR effect is displayed based on the tracking data, whether the AR effect appears as expected or desired depends on the tracking data's accuracy, such as the accuracy of the position and depth of the virtual object in the field of the second user's view. The AR application determines the position of the virtual object using various methods and tracking data as described in the steps 310 to 340 and elsewhere herein to improve the accuracy and realism (e.g., the appropriate depth-perception visual cues) of the virtual object.

Figure 4:
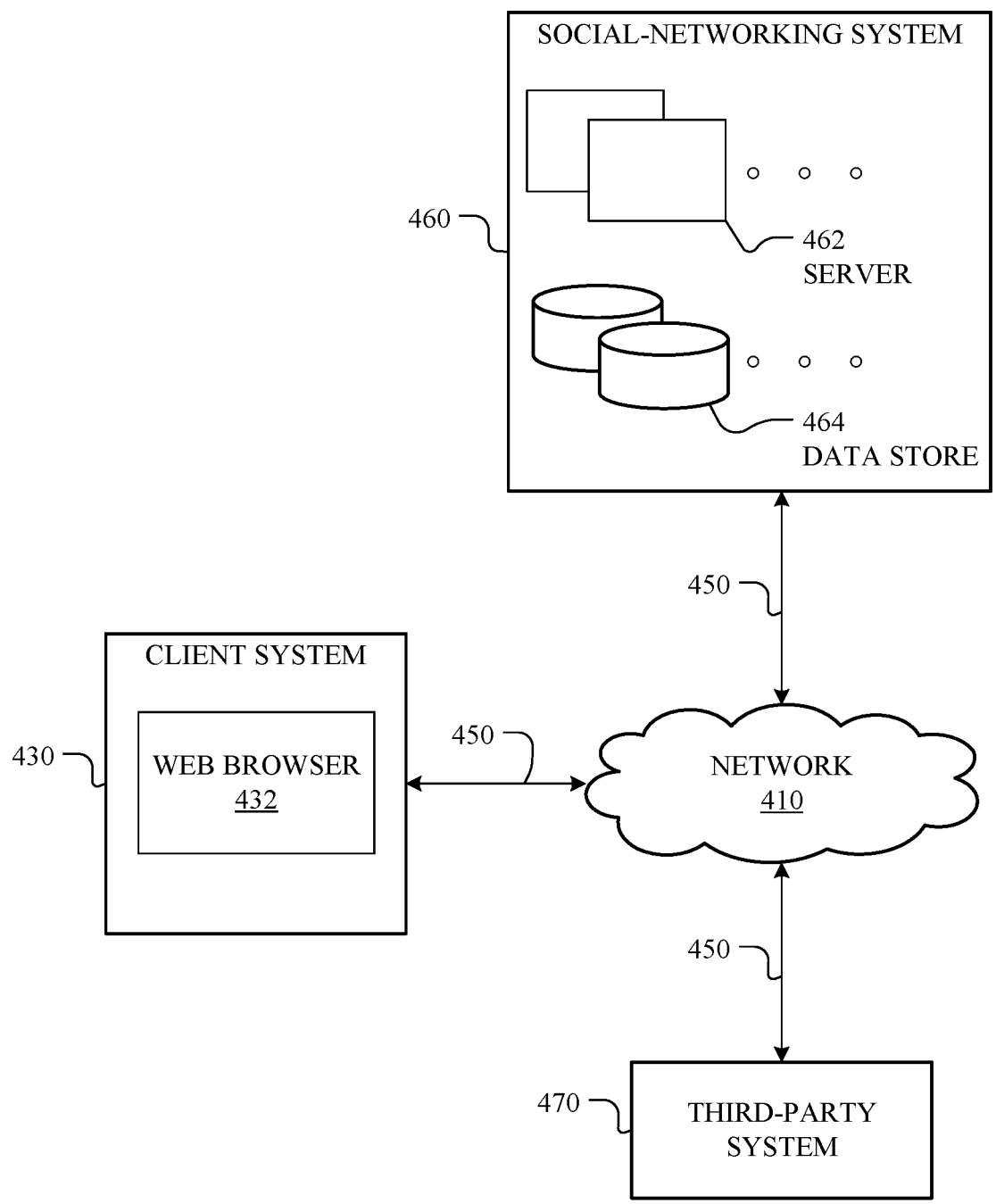
FIG. 4 illustrates an example network environment associated with a social-networking system in particular embodiments.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
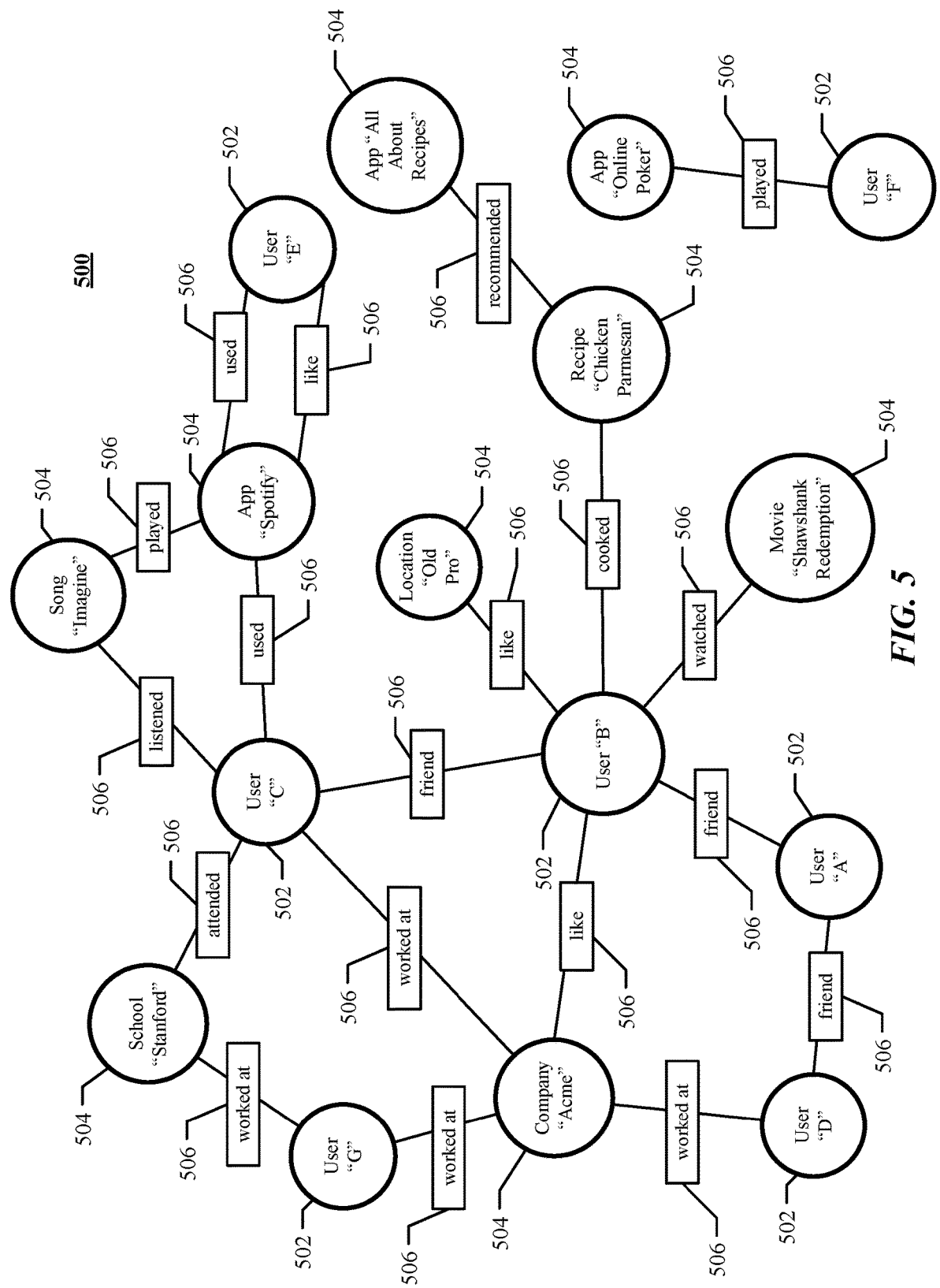
FIG. 5 illustrates an example social graph in particular embodiments.

FIG. 5 illustrates example social graph 500. In particular embodiments, social-networking system 460 may store one or more social graphs 500 in one or more data stores. In particular embodiments, social graph 500 may include multiple nodes-which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506. The degree of separation between two objects represented by two nodes, respectively, is a count of edges in a shortest path connecting the two nodes in the social graph 500. As an example and not by way of limitation, in the social graph 500, the user node 502 of user "C" is connected to the user node 502 of user "A" via multiple paths including, for example, a first path directly passing through the user node 502 of user "B," a second path passing through the concept node 504 of company "Acme" and the user node 502 of user "D," and a third path passing through the user nodes 502 and concept nodes 504 representing school "Stanford," user "G," company "Acme," and user "D." User "C" and user "A" have a degree of separation of two because the shortest path connecting their corresponding nodes (i.e., the first path) includes two edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particulAR application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particulAR application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Figure 6:
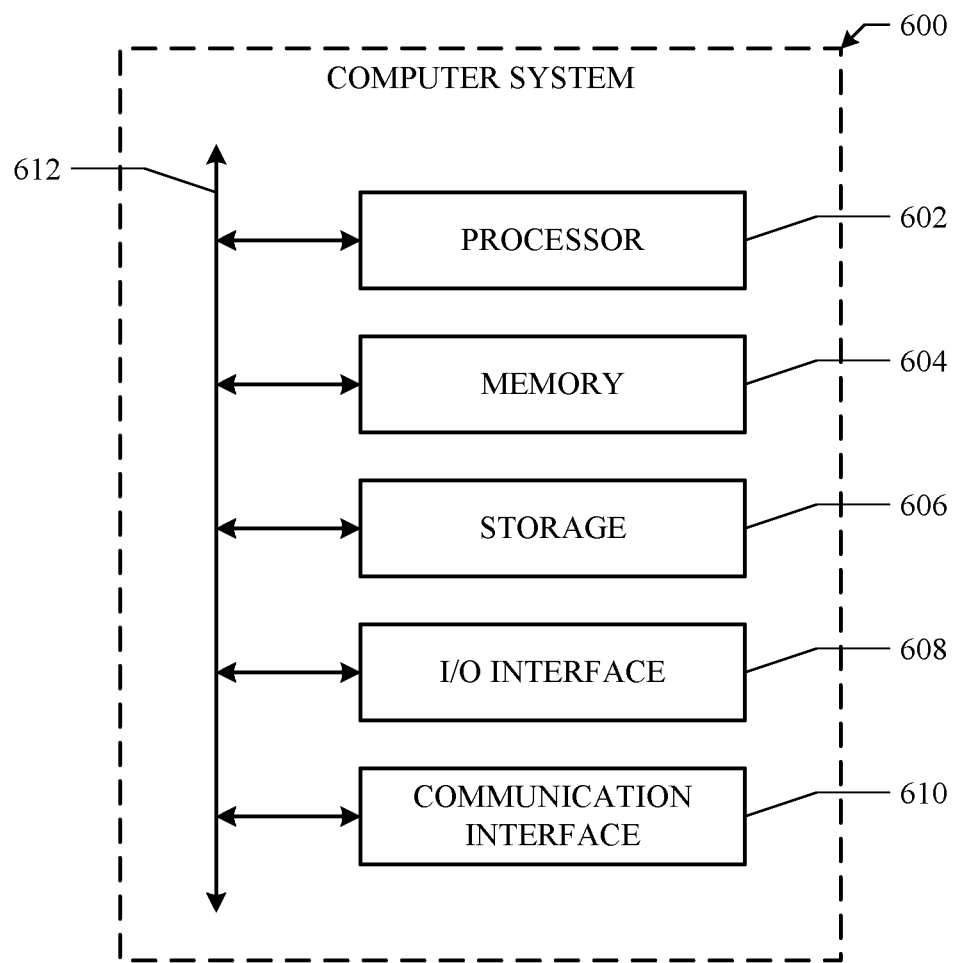
FIG. 6 illustrates an example computer system in particular embodiments.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
accessing a tracking record of a real-world object during a first movement session, the tracking record comprising data indicating relative spatial distances between the real-world object and a first user;
determining a position and an orientation of a virtual object on a display screen of a second user based on a relative position between a current location of the second user and the virtual object determined using the relative spatial distances between the real-world object and the first user, wherein the virtual object represents the real-world object;
generating an image of the virtual object based on the determined position and the determined orientation of the virtual object; and
displaying the image of the virtual object on the display screen.

2. The method of claim 1, wherein the data in the tracking record comprises a plurality of time measurements and a plurality of locations of the real-world object during the first movement session.

3. The method of claim 1, further comprising:
recording a second tracking record of a second real-world object during a second movement session; and
transmitting the second tracking record to a device associated with the first user, the device having a second display screen;
wherein the second tracking record is configured to be used to position a second image of a second virtual object on the second display screen of the first user.

4. The method of claim 3, wherein the first movement session and the second movement session are concurrently occurring, and the image of the virtual object and the second image of the second virtual object are displayed concurrently on the display screen and the second display screen, respectively.

5. The method of claim 1, wherein the first user and the second user are the same person.

6. The method of claim 1, wherein the tracking record is shared with the second user through a social networking system, and wherein the first user and the second user are within a threshold degree of separation within the social networking system.

7. The method of claim 1, further comprising:
determining a depth of the virtual object based on the current location of the second user and the tracking record of the real-world object; and
scaling the virtual object based on the depth.

8. A system comprising: one or more processors, and a memory coupled to the processors comprising instructions executable by the processors, the processors being operable when executing the instructions to:
access a tracking record of a real-world object during a first movement session, the tracking record comprising data indicating relative spatial distances between the real-world object and a first user;
determine a position and an orientation of a virtual object on a display screen of a second user based on a relative position between a current location of the second user and the virtual object determined using the relative spatial distances between the real-world object and the first user, wherein the virtual object represents the real-world object;
generate an image of the virtual object based on the determined position and the determined orientation of the virtual object; and
display the image of the virtual object on the display screen.

9. The system of claim 8, wherein the data in the tracking record comprises a plurality of time measurements and a plurality of locations of the real-world object during the first movement session.

10. The system of claim 8, further comprising:
recording a second tracking record of a second real-world object during a second movement session; and
transmitting the second tracking record to a device associated with the first user, the device having a second display screen;
wherein the second tracking record is configured to be used to position a second image of a second virtual object on the second display screen of the first user.

11. The system of claim 10, wherein the first movement session and the second movement session are concurrently occurring, and the image of the virtual object and the second image of the second virtual object are displayed concurrently on the display screen and the second display screen, respectively.

12. The system of claim 8, wherein the first user and the second user are the same person.

13. The system of claim 8, wherein the tracking record is shared with the second user through a social networking system, and wherein the first user and the second user are within a threshold degree of separation within the social networking system.

14. The system of claim 8, further comprising:
determining a depth of the virtual object based on the current location of the second user and the tracking record of the real-world object; and
scaling the virtual object based on the depth.

15. One or more computer-readable non-transitory storage media embodying software that is operable when executed to:
access a tracking record of a real-world object during a first movement session, the tracking record comprising data indicating relative spatial distances between the real-world object and a first user;
determine a position and an orientation of a virtual object on a display screen of a second user based on a relative position between a current location of the second user and the virtual object determined using the relative spatial distances between the real-world object and the first user, wherein the virtual object represents the real-world object;
generate an image of the virtual object based on the determined position and the determined orientation of the virtual object; and
display the image of the virtual object on the display screen.

16. The media of claim 15, wherein the data in the tracking record comprises a plurality of time measurements and a plurality of locations of the real-world object during the first movement session.

17. The media of claim 15, further comprising:
recording a second tracking record of a second real-world object during a second movement session; and
transmitting the second tracking record to a device associated with the first user, the device having a second display screen;
wherein the second tracking record is configured to be used to position a second image of a second virtual object on the second display screen of the first user.

18. The media of claim 17, wherein the first movement session and the second movement session are concurrently occurring, and the image of the virtual object and the second image of the second virtual object are displayed concurrently on the display screen and the second display screen, respectively.

19. The media of claim 15, wherein the first user and the second user are the same person.

20. The media of claim 15, wherein the tracking record is shared with the second user through a social networking system, and wherein the first user and the second user are within a threshold degree of separation within the social networking system.

* * * * *